US008175593B2

(12) United States Patent
Lee et al.

(10) Patent No.: US 8,175,593 B2
(45) Date of Patent: May 8, 2012

(54) METHOD FOR DISPLAYING INFORMATION REGARDING THE CONDITION OF A PORTABLE TERMINAL

(75) Inventors: Sin-Jae Lee, Suwon-si (KR); Eun-Ki An, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 1249 days.

(21) Appl. No.: 11/657,396

(22) Filed: Jan. 24, 2007

(65) Prior Publication Data

US 2007/0190999 A1 Aug. 16, 2007

(30) Foreign Application Priority Data

Jan. 24, 2006 (KR) ........................ 10-2006-0007435

(51) Int. Cl.
*H04M 24/00* (2006.01)

(52) U.S. Cl. ..................... 455/425; 455/566; 455/412.2; 455/567; 715/747

(58) Field of Classification Search .................. 455/566, 455/412.2, 567; 715/747, 345
See application file for complete search history.

(56) References Cited

U.S. PATENT DOCUMENTS

| | | | | |
|---|---|---|---|---|
| 7,433,714 | B2 * | 10/2008 | Howard et al. | 455/567 |
| 7,720,467 | B2 * | 5/2010 | Ishii | 455/421 |
| 2002/0065110 | A1 * | 5/2002 | Enns et al. | 455/566 |
| 2003/0013483 | A1 * | 1/2003 | Ausems et al. | 455/556 |
| 2003/0064757 | A1 * | 4/2003 | Yamadera et al. | 455/566 |
| 2003/0078077 | A1 | 4/2003 | Kokubo | |
| 2004/0203674 | A1 * | 10/2004 | Shi et al. | 455/415 |
| 2005/0032505 | A1 * | 2/2005 | Himelhoch | 455/405 |
| 2006/0279256 | A1 * | 12/2006 | Bletsas | 320/128 |

FOREIGN PATENT DOCUMENTS

| | | |
|---|---|---|
| CN | 1723682 | 1/2006 |
| EP | 1662760 A1 * | 5/2006 |
| WO | WO 2005/034491 | 4/2005 |
| WO | WO 2005/039157 | 4/2005 |

* cited by examiner

*Primary Examiner* — Kamran Afshar
*Assistant Examiner* — Edward Zhang
(74) *Attorney, Agent, or Firm* — The Farrell Law Firm, P.C.

(57) ABSTRACT

Disclosed is a method for displaying condition information of a portable terminal, the method including determining if a signal requesting output of the condition information is detected while an application is run by the portable terminal; checking a predetermined output type of condition information when the signal requesting output of the condition information is detected; and outputting the condition information in accordance with the output type of condition information.

14 Claims, 4 Drawing Sheets

METHOD FOR DISPLAYING INFORMATION REGARDING THE CONDITION OF A PORTABLE TERMINAL

PRIORITY

This application claims priority under 35 U.S.C. §119 to an application entitled "Method For Displaying Information Regarding Condition of Portable Terminal" filed with the Korean Intellectual Property Office on Jan. 24, 2006 and assigned Ser. No. 2006-7435, the contents of which are incorporated herein by reference.

BACKGROUND OF THE INVENTION

1. Field of the Invention

The present invention relates generally to a portable terminal, and in particular, to a method for displaying information regarding the condition of a portable terminal.

2. Description of the Related Art

Portable terminals are extensively used among individuals for various types of information and entertainment. Particularly, portable terminals are evolving to provide better video and audio output so that users can enjoy various types of entertainment, including music and games.

However, conventional portable terminals have a limitation in that, when they switch to the full-screen mode for high-quality video output or gaming, various types of information regarding the condition of the terminals is covered by full-screen images. This means that, when a user wants to check the battery level, date/time, or reception strength of his terminal, he must terminate the currently run application so that its images, which had been displayed on the full screen, disappear.

SUMMARY OF THE INVENTION

Accordingly, the present invention has been made to solve the above-mentioned problems occurring in the conventional art, and one aspect of the present invention is to provide a method for displaying information regarding the condition of a portable terminal while the terminal runs an application.

The present invention is directed to a method for displaying condition information of a portable terminal, the method including determining if a signal requesting output of the condition information is detected while the portable terminal runs an application; when the signal requesting output of the condition information is detected, checking a predetermined output type of condition information; and outputting the condition information in accordance with the output type of condition information.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the following description of the present invention, a detailed description of known functions and configurations incorporated herein is omitted to avoid making the subject matter of the present invention unclear.

It is to be noted that any type of function ran on a portable terminal will hereinafter be referred to as an application. In addition, information displayed by a display unit at a request of a user while an application is running will be referred to as information regarding the condition of the portable terminal.

Figure 1:
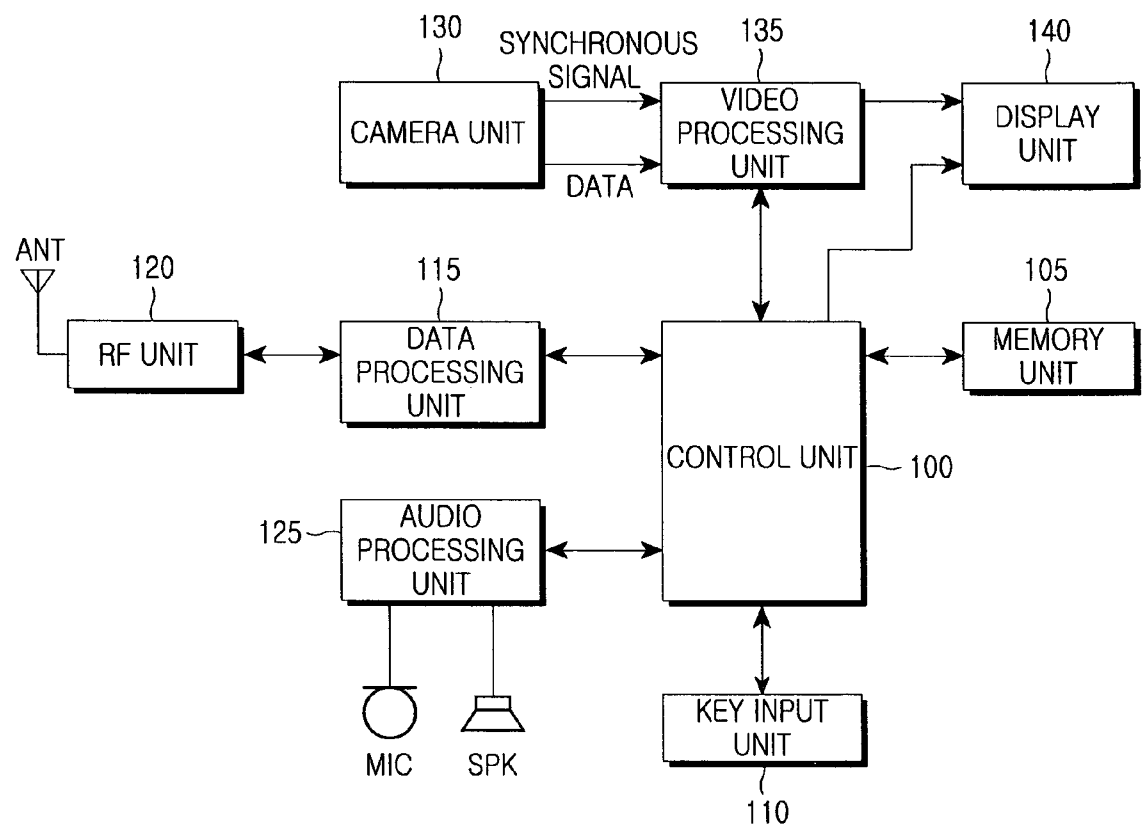
FIG. 1 is a block diagram showing the overall construction of a portable terminal according to the present invention.

FIG. 1 is a block diagram showing the overall construction of a portable terminal according to the present invention. Referring to FIG. 1, the portable terminal has a control unit 100 for controlling the overall operation of the terminal. Particularly, the control unit 100, according to the present invention, performs control necessary to run various types of applications. The user can set up information regarding the condition of the portable terminal, which is to be displayed, while the portable terminal runs an application. Then, a memory unit 105 stores the information setup under the control of the control unit 100. In addition, the user can set up the priority of the information regarding the condition of the portable terminal.

The memory unit 105 then stores the priority setup under the control of the control unit 100. When the condition information is displayed, the control unit 100 terminates the display after a predetermined period of time and switches to a mode for running the application, which has been ran before the display of information. According to the present invention, the control unit 100 controls a display unit 140 so as to display an application based on the setup by the user upon receiving a signal requesting the display of condition information in an application running mode. Alternatively, the control unit 100 is adapted to detect the number or duration of key operation for generating a signal requesting the display of condition information. Particularly, when a predetermined number or duration of key operation is detected, corresponding condition information is displayed subsequently under the control of the control unit 100.

The memory unit 105 includes a program memory and data memories. The program memory stores programs for controlling the normal operation of the portable terminal. The memory unit 105 is adapted to store items of condition information, which is to be displayed based on the user's input. The memory unit 105 also stores the priority of the items of condition information, as well as its display time, based on the user's setup.

The portable terminal has a key input unit 110 including numeric keys, character keys for text information input, and function keys for setting up various functions The key input unit 110 has a separate key for displaying information regarding the condition of the portable terminal in an application running mode. In addition, a number of keys of the key input unit 110 can have shortcuts assigned thereto, which correspond to respective items of the condition information to be displayed. Alternatively, one of the keys of the key input unit 110 can be used to display information regarding the condition of the portable terminal.

The portable terminal has a data processing unit 115, which includes a transmitter for encoding and modulating transmitted signals, as well as a receiver for decoding and demodulating received signals.

The portable terminal has a Radio Frequency (RF) unit 120 for communication of the portable terminal. The RF unit 120 includes an RF transmitter (not shown) for up-converting the frequency of received signals and amplifying them, as well as an RF receiver (not shown) for subjecting received signals to low-noise amplification and down-converting their frequency.

The portable terminal has an audio processing unit 125, which may constitute a codec including a data codec (not shown) for processing for example, packet data, and an audio codec (not shown) for processing audio signals (e.g. voice). Particularly, the audio processing unit 125 converts digital audio signals, which are received from the data processing unit 115, into analog signals through the audio codec for regeneration. In addition, the audio processing unit 125 converts analog audio signals, which are generated and transmitted by a microphone, into digital audio signals through the audio codec and transmits them to the data processing unit 115. The codecs may be separate from or integral with the control unit 100.

The portable terminal has a camera unit 130 provided with a camera sensor (not shown) for obtaining video data and converting obtained optical signals into electric signals. It is assumed herein that a Charge Coupled Device (CCD) sensor is used as the camera sensor. The portable terminal has a video processing unit 135 for generating screen data, which is used to display video signals. Under the control of the control unit 100, the video processing unit 135 transmits received video signals in accordance with standards of the display unit 140. In addition, the video processing unit 135 compresses and expands video data. The camera 130 and the video processing unit 135 can constitute a single camera unit.

The display unit 140 displays the current condition, as well as processing and operation conditions, in accordance with key input from the key input unit 110 under the control of the control unit 100. The display unit 140 displays video data outputted from the video processing unit 135 together with a user interface for indicating photography functions. A Liquid Crystal Display (LCD) may be used as the display unit 140. In this case, the display unit 140 includes an LCD controller (not shown), a memory (not shown) for storing video data, and an LCD display device. When a touch-screen-type LCD is used, the key input unit 110 and the LCD act together as an input unit. The display unit 140 has a video data display unit for outputting video data. The present invention, the display unit 140 displays various images in accordance with the currently-run application. The display unit 140 also displays information regarding the condition of the portable terminal in accordance with control signals from the control unit 100. In order to display information regarding the condition of the portable terminal, the display unit 140 uses one of a pop-up window and switches from an application display screen to a corresponding screen.

Figure 2:
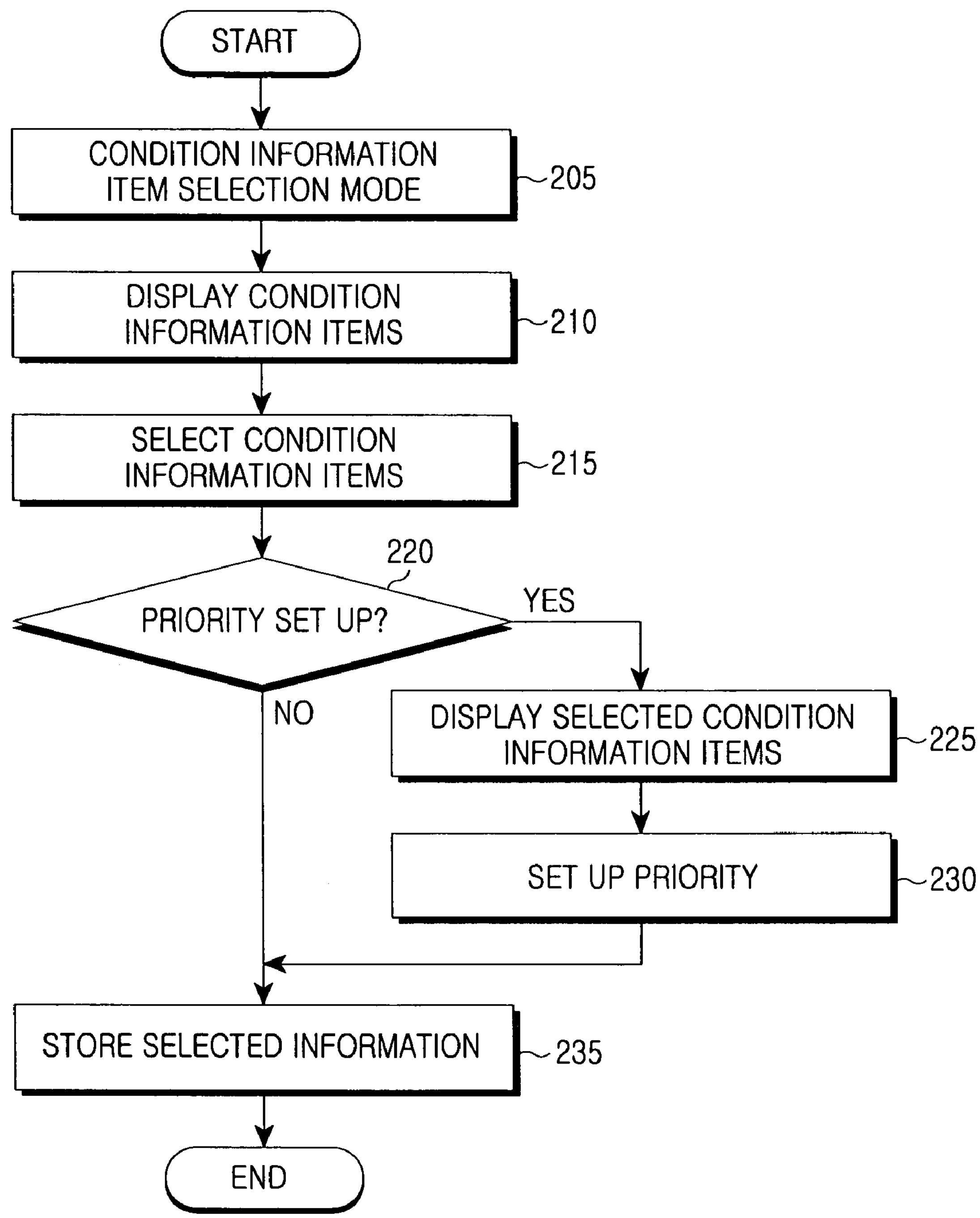
FIG. 2 is a flowchart illustrating the setting up of information regarding the condition of a portable terminal, which is to be displayed, according to the present invention.

FIG. 2 is a flowchart illustrating the setting up of information regarding the condition of a portable terminal, which is to be displayed. Referring to FIG. 2, the control unit 100 provides the user with a menu for selecting condition information, which is to be displayed by the display unit 140, while an application is run in step 205. After entering into the condition information selection mode, the control unit 100 controls the display unit 140 so as to display items of the condition information in step 210. The user selects at least one item from the displayed items of the condition information in step 215. It is assumed that the items of the condition information, which are selectable by the user, include the present time, reception sensitivity, and battery level.

The control unit 100 determines if the user has selected a menu for setting up the priority of selected items of the condition information in step 220. When the user has not selected the menu to set up the priority, the control unit 100 stores the items of the condition information, which had been selected in step 215, in the memory unit 105 in step 235. When the user has selected the menu to set up the priority, the control unit 100 proceeds to step 325 and displays the selected items of the condition information. In step 230 the user sets up the priority of the displayed items of the condition information. After the priority is set up in step 335, the control unit 100 stores the items of the condition information, the priority of which has been set up in step 230, in the memory unit 105 in step 335.

Figure 3:
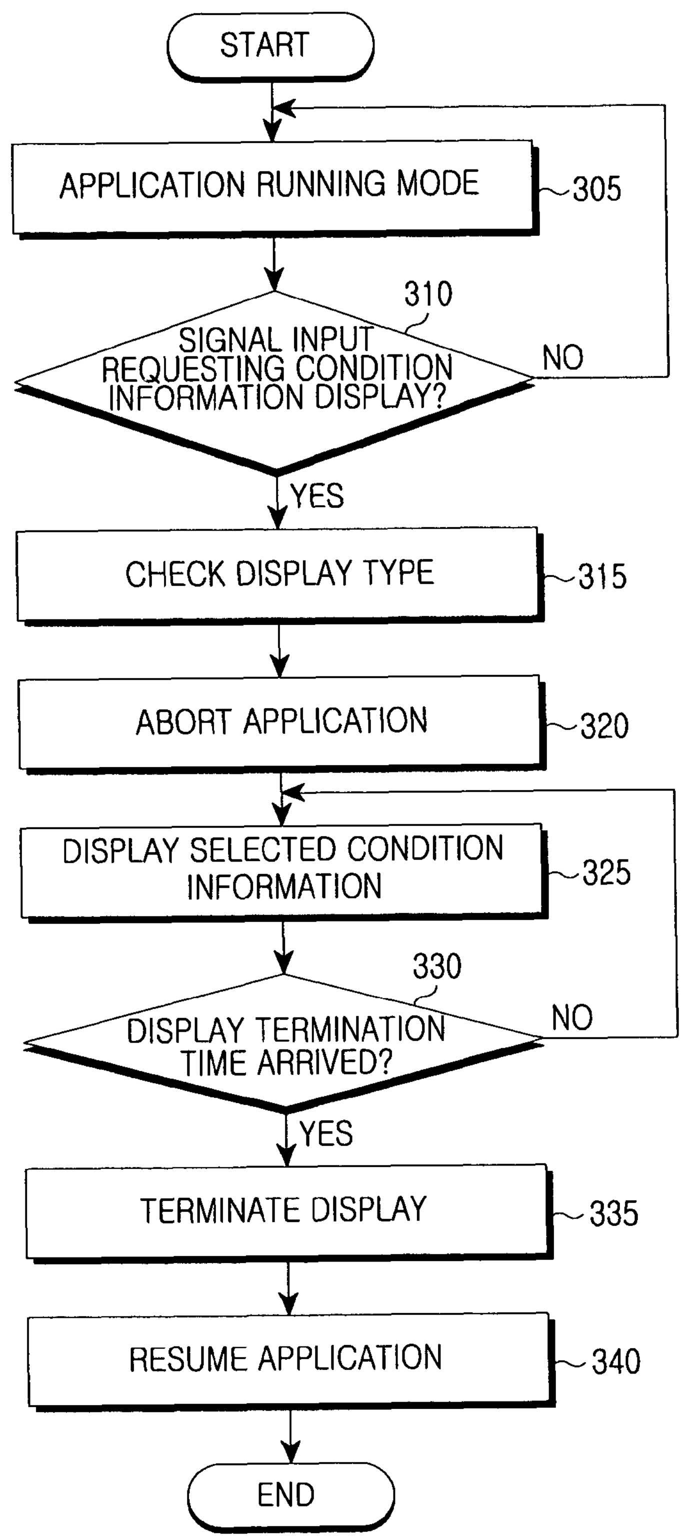
FIG. 3 is a flowchart illustrating the displaying of information regarding the condition of a portable terminal according to the present invention.

FIG. 3 is a flowchart illustrating the displaying of information regarding the condition of a portable terminal according to the present invention. Referring to FIG. 3, the control unit 100 enters into an application running mode, i.e. it performs at least one of the various functions of the portable terminal in step 305. When a predetermined input signal is generated in the application running mode, the control unit 100 monitors the transmission of a signal requesting display of the condition information of the portable terminal, which has been set up in the course of FIG. 2, from the key input unit 110 in step 310. When the signal requesting display of the condition information is received, the control unit 100 checks the display type of the condition information in step 315. Although not shown in the drawing, the user may set up the display type as desired. For example, the condition information may be displayed on the display unit 140 after pausing the application. Alternatively, the condition information may be displayed in a pop-up window.

After checking the display type in step 315, in step 320, the control unit 100 pauses the application currently-running. The control unit 100 controls the display unit 140 so as to display the condition information as selected by the user in step 325. In step 330, the control unit 100 checks for the arrival of a predetermined time, at which the display of the condition information is to end. Particularly, the display of the condition information can be terminated when an input signal is generated by a confirmation key, for example, while the condition information is displayed. Alternatively, the user may preset the time for terminating the display of the condition information so that the display is terminated when the time arrives. It is assumed that the display of the condition information is terminated when the predetermined time arrives. When it is confirmed in step 330 that the predetermined time for terminating the display has arrived, the control unit 100 proceeds to step 335 and terminates the display. The control unit 340 resumes the application, which had been run before the condition information was displayed, in step 340.

According to the present invention, at least one piece of information is displayed in accordance with the user's selection. For example, when a signal requesting display of condition information is detected, the control unit 100 displays a plurality of pieces of condition information based on the priority.

Figure 4:
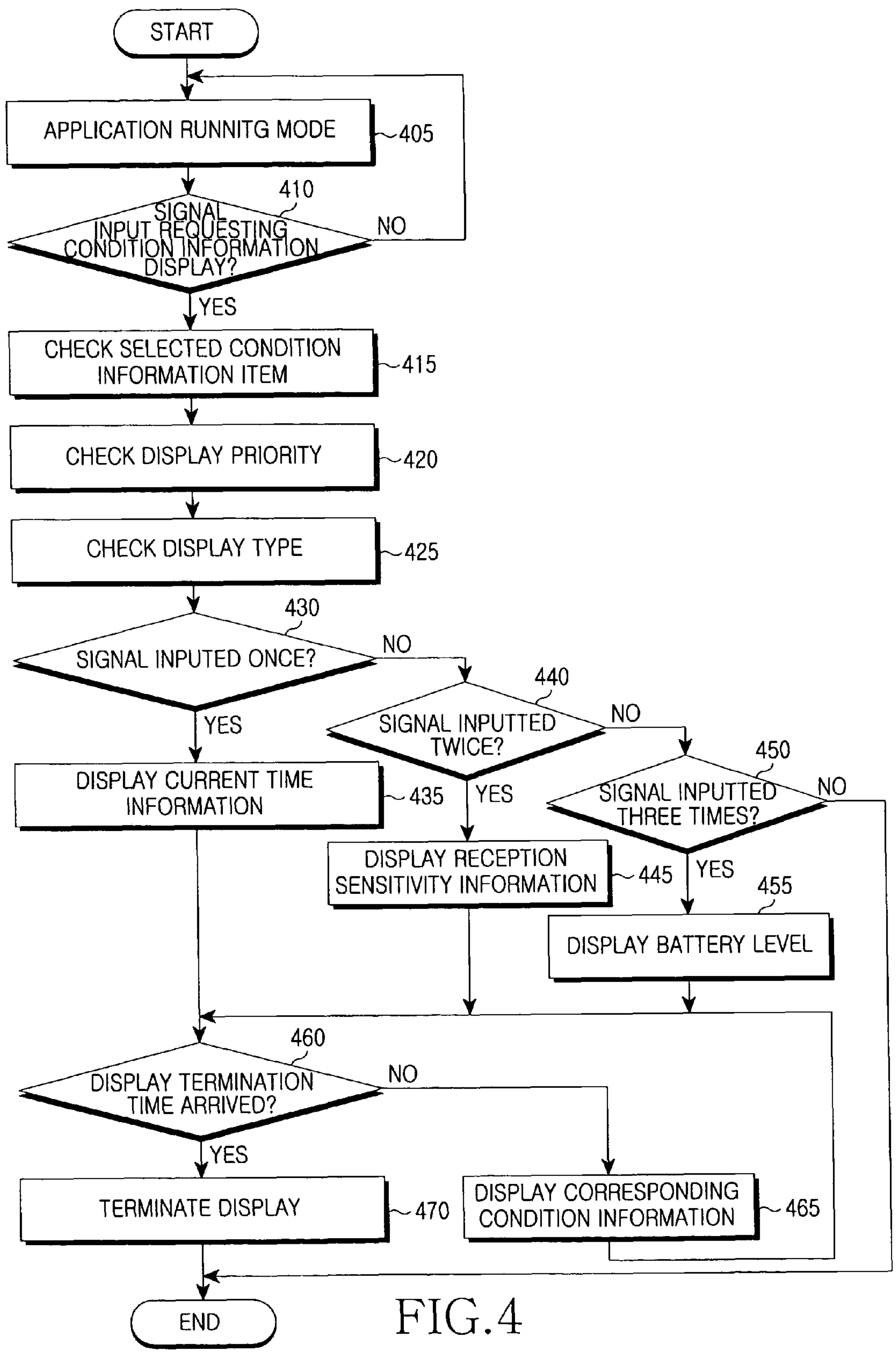
FIG. 4 is a flowchart illustrating the displaying of information regarding the condition of a portable terminal according to another embodiment of the present invention.

FIG. 4 is a flowchart illustrating the displaying of information regarding the condition of a portable terminal according to another embodiment of the present invention. Referring to FIG. 4, the control unit 100 enters into an application running mode, i.e. it performs at least one of the various functions of the portable terminal in step 405. When a predetermined input signal is generated in the application running mode, the control unit 100 monitors the transmission of a signal requesting display of the condition information of the portable terminal, which has been set up in the course of FIG. 2, from the key input unit 110 in step 410. When the signal requesting display of the condition information is received, the control unit 100 checks the items of the condition information, which have been selected by the user in the course of FIG. 2, in step 415.

In step 420 the control unit 100 checks the priority of the items of the condition information, which have been checked in step 415, in step 420. It is assumed in the that the items of the condition information, which are selectable by the user, include current date and time, reception sensitivity, and battery level. In addition, the priority of the selected items is in the following order: current date and time, reception sensitivity, and battery level. The control unit 100 checks the display type of the condition information in step 425 in a manner similar to that of step 315 shown in FIG. 3.

The control unit 100 determines how many signals requesting the display have been detected in step 410. Particularly, the control unit 100 decides if a single signal requesting the display of the condition information has been detected in step 430. If so, the control unit 100 displays information regarding the current time, which has top priority, in accordance with a preset display type in step 435. If not, the control unit 100 proceeds to step 440 and decides if two signals have been detected. When it is confirmed in step 440 that two signals have been detected, the control unit 100 displays information regarding the reception sensitivity, which has the second-highest priority, in accordance with a preset display type in step 445. When it is confirmed in step 440 that more than two signals have been detected, the control unit 100 proceeds to step 450 and determines if three signals have been inputted. If so, the control unit 100 displays information regarding the battery level, which has the third-highest priority, in accordance with a preset display type in step 455.

Although it is assumed that the procedure ends without display of the condition information when at least three signals are inputted, the control unit 100 may request that the user re-enter signals in that case. Alternatively, the condition information may contain at least three items, which are displayed when corresponding key input signals are generated.

After displaying information regarding one of a current time, reception sensitivity, and battery level in accordance with the number of inputted signals, the control unit 100 checks for the arrival of a predetermined time, at which the display is to end, in step 460. If the predetermined time has not yet arrived, the control unit 100 proceeds to step 465 and continuously display the current item of the condition information. Upon arrival of the predetermined time, the control unit 100 terminates the display in step 470.

Although it is assumed that the display of the condition information is terminated when a predetermined display termination time arrives while the information is being displayed, the display may also end when the user operates a confirmation key, for example, during the display.

As mentioned above, the present invention is advantageous in that, even when an application is run by a portable terminal, information regarding the condition of the terminal can be displayed on the display unit as desired by the user.

While the invention has been shown and described with reference to certain preferred embodiments thereof, it will be understood by those skilled in the art that various changes in form and details may be made therein without departing from the spirit and scope of the invention as defined by the appended claims. For example, although it has been assumed that the condition information is displayed in accordance with the number or duration of key operation, respective items of the condition information may have corresponding shortcuts on the key input unit so that one of the items can be displayed when its own shortcut is selected while an application is run. Alternatively, the control unit may be adapted to display condition information when a signal is generated for a predetermined period of time by a key for requesting the condition information while running an application. As such, the condition information can be displayed in various key operation methods.

What is claimed is:

1. A method for displaying condition information of a portable terminal, the method comprising:

receiving selection of condition information to be output when running an application from a user;

determining if a signal requesting output of the condition information is detected while the application is run;

checking a priority of condition information to be displayed, the priority having been determined by a user, when a signal requesting display of a plurality of pieces of condition information is generated;

checking a predetermined output type of condition information when the signal requesting output of the condition information is detected;

outputting the condition information in accordance with the output type of condition information, and displaying the condition information successively in accordance with the priority.

2. The method as claimed in claim 1, wherein the condition information includes at least one of current date, time information, reception sensitivity information or battery level information.

3. The method as claimed in claim 1, wherein the condition information is displayed in a predetermined key operation method.

4. The method as claimed in claim 3, wherein different condition information is displayed in accordance with the signal requesting output of the condition information, each condition information corresponding to a predetermined number of key operation.

5. The method as claimed in claim 3, further comprising receiving setup of a shortcut corresponding to condition information to be displayed so that, when operation of the shortcut is detected, corresponding condition information is displayed.

6. The method as claimed in claim 3, wherein the condition information is displayed when key operation is detected for a predetermined period of time.

7. The method as claimed in claim 1, wherein, according to the output type of condition information, the condition information is displayed on a screen of a display unit after pausing the application, the application having been displayed on the screen.

8. The method as claimed in claim 1, wherein, when a predetermined time has elapsed while the condition information is displayed, display of the condition information is terminated together with switching to an application running mode.

9. A method for displaying condition information of a portable terminal, the method comprising:

receiving selection of condition information to be displayed while running an application from a user;

receiving setup of a priority of the condition information;

receiving input of a signal resulting from a key for requesting display of the condition information while the application is running;

checking the priority of the condition information to be displayed, the priority having been setup by a user, when a signal requesting display of a plurality of pieces of condition information is generated:, and displaying the condition information successively in accordance with the priority after pausing the application.

10. The method as claimed in claim 9, wherein the condition information includes at least one of current date and time information, reception sensitivity information, or battery level information.

11. The method as claimed in claim 9, further comprising displaying the condition information when the key for requesting display of the condition information has been operated for a predetermined period of time.

12. The method as claimed in claim 9, further comprising:

determining the number of key operation for requesting display of the condition information; and displaying predetermined condition information corresponding to the number of key operation.

13. The method as claimed in claim 9, further comprising receiving setup of a shortcut corresponding to the condition information to be displayed so that, when operation of the shortcut is detected, corresponding condition information is displayed.

14. The method as claimed in claim 9, wherein, when a predetermined time has elapsed while the condition information is displayed, display of the condition information is terminated together with switching to an application running mode.

* * * * *